(12) United States Patent
Korst et al.

(10) Patent No.: US 6,643,083 B2
(45) Date of Patent: Nov. 4, 2003

(54) METHOD AND SYSTEM FOR RETRIEVING BLOCKS OF DATA FROM A STORAGE MEDIUM

(75) Inventors: Johannes Henricus Maria Korst, Eindhoven (NL); Sebastian Egner, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 296 days.

(21) Appl. No.: 09/870,065

(22) Filed: May 30, 2001

(65) Prior Publication Data

US 2002/0036856 A1 Mar. 28, 2002

(30) Foreign Application Priority Data

Jun. 2, 2000 (EP) .............................................. 00201950

(51) Int. Cl.[7] ................................................. G11B 5/09
(52) U.S. Cl. ........................... 360/48; 360/47; 709/105; 725/96
(58) Field of Search ............................... 725/97, 96, 95, 725/93, 92, 91, 87, 86; 714/6; 709/105, 229; 707/10, 2, 8, 4, 5, 111, 112, 114; 360/48, 47, 49, 72.2, 72.1, 78.14

(56) References Cited

U.S. PATENT DOCUMENTS 5,544,313 A * 8/1996 Shachnai et al. ............. 725/92
6,016,552 A * 1/2000 Lee et al. ...................... 714/6
6,138,221 A * 10/2000 Korst et al. ................. 711/167
6,415,328 B1 * 7/2002 Korst .......................... 709/232

FOREIGN PATENT DOCUMENTS

WO WO9854657 12/1998

OTHER PUBLICATIONS

Hweehwa Pang et al, "Resource Scheduling in a High–Performance Multimedia Server", IEEE Transactins on Knowledge and Data Engineering, Mar. 4, 1999, IEEE, USA, vol. 11, No. 2, pp. 303–320, XP002178309.

* cited by examiner

*Primary Examiner*—Alan T. Faber

(57) ABSTRACT

A system (100) has a storage medium (110) that contains a number of storage units (108). A multimedia title is stored in the storage medium (110) as a number of blocks, whereby some of the blocks are stored multiple times such that different storage units (108) contain a copy of that block. Retrieving blocks from the storage medium (110) for supply to a user is executed in cycles and the system has for some of the blocks the freedom to choose from which of the storage units (108) the block is retrieved in order to balance the load on the storage units (108). Furthermore, the system (100) is arranged to look ahead a number of cycles to determine what blocks in the near future are necessary and to retrieve these future blocks earlier if the storage units are not yet fully occupied. The additional freedom to schedule retrieval of a block at earlier moments in time provides a further mechanism to balance the load on the storage units.

10 Claims, 1 Drawing Sheet

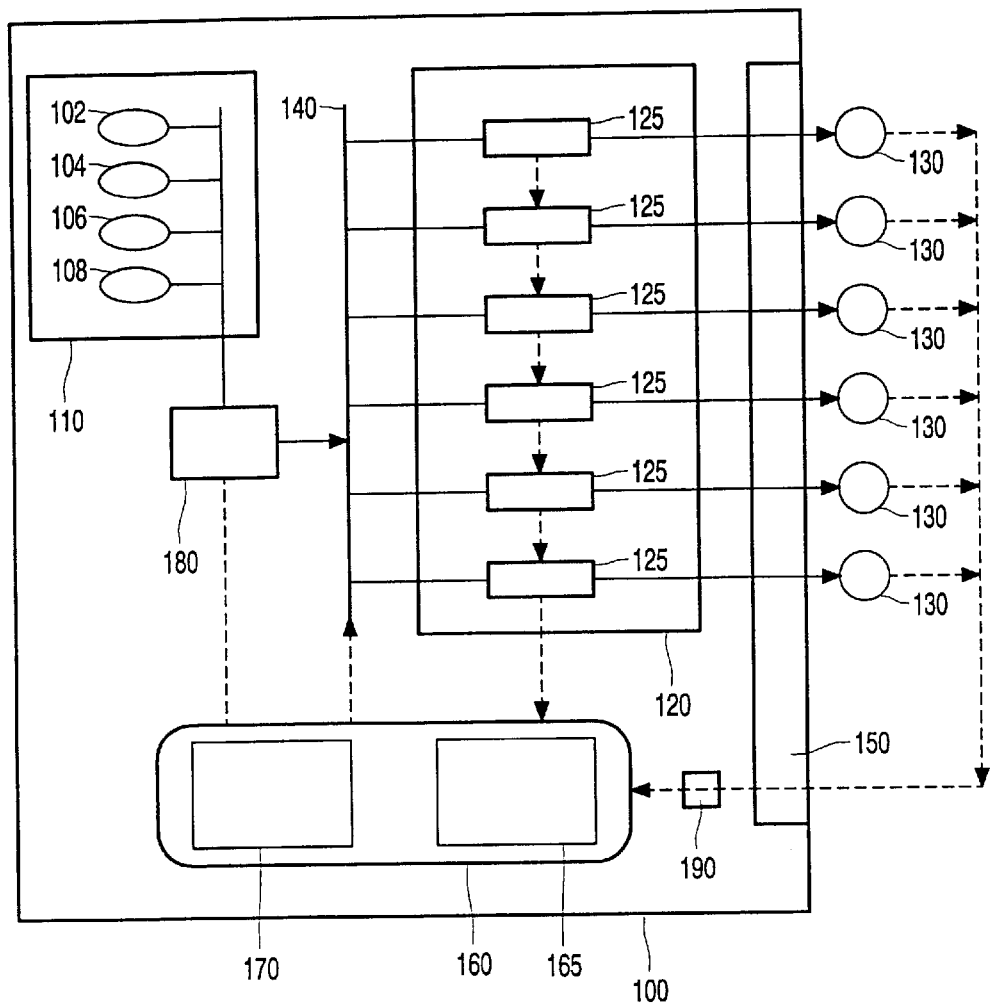

METHOD AND SYSTEM FOR RETRIEVING BLOCKS OF DATA FROM A STORAGE MEDIUM

The invention relates to a system for in cycles retrieving blocks of data from a storage medium and supplying the blocks in the form of data streams to users, wherein a number of the blocks are stored multiple times in respective storage units of the storage medium.

The invention further relates to a method of in cycles retrieving blocks of data from a storage medium and supplying the blocks in the form of data streams to users, wherein a number of the blocks are stored multiple times in respective storage units of the storage medium.

The International Patent Application published under number WO 98/54657 describes a system that may be used in multimedia server, or more specifically, in a video-on-demand or near-video-on-demand server. A requirement in this system is to supply a continuous, uninterrupted stream of data to each active user. Data is read from a conventional storage medium, such as hard disks, which are arranged in a disk array, such as a RAID system. In general, a distinction can be made between a fixed consumption rate and a variable consumption rate system. In a fixed consumption rate system data is supplied to a user as a fixed rate data stream. Usually, the rate is identical for each stream in the system. An example of such a system is a near video-on-demand system, wherein a number of films can be played in parallel and the same film may be played several times in parallel, where regularly, for instance ever 15 minutes, a new copy of the same film is started. In a variable consumption rate system the rate at which a user consumes data varies over time. A maximum consumption rate can be defined for each data stream. In practice, an identical maximum consumption rate is used for all streams, although it may be possible to support streams with different maximum consumption rates. Variable consumption rate systems are, for instance, used for systems which support VCR-like functions such as pause or slow motion or systems which use a data compression technique with variable bit rate like MPEG-2.

To supply data to a user as a continuous stream, special scheduling schemes for reading data from the disks are required with an appropriate scheme for temporarily buffering the read data before the data is supplied to the user. The system operates in cycles, whereby in a cycle a stream consumes data from a buffer while new data is read from disk and supplied to the buffer for future consumption. For a fixed consumption rate system, at fixed regular intervals for each stream a fixed amount of data (sufficient to last one cycle) is read and stored in the buffer. Within a variable consumption rate system, different streams may empty a predetermined block of the buffer at different moments. During a cycle only data is read for streams whose buffers have room for a block of data. Other streams are skipped. As a consequence, the duration of a cycle in a variable consumption system is variable, bounded by the situation in which all active streams require a new block of data.

The storage medium in the known system comprises a number of independent storage units. The performance of a storage unit is limited and the system is designed in such a way that during a cycle of maximum duration, each storage can at least read a certain maximum number of data blocks. During normal operation, none of the storage units should be overloaded with requests, i.e. should not be requested to read more data blocks in one cycle than this maximum number of blocks. To improve the overall bandwidth of the storage medium, in the known system a portion of the data blocks is stored multiple times in the storage medium, whereby different copies of a block are stored in different, randomly chosen storage units. The scheduler of the system then has the freedom to choose the retrieval of such a duplicated block from one of the storage units on which the copies reside. This freedom is used to balance the load of the storage units so that the storage medium as a whole can read more data blocks per cycle. The probability that none of the storage units is overloaded can be chosen arbitrarily high by choosing a larger portion of the data blocks that are stored multiple times.

It is an object of the invention to provide a system as described in the preamble with a comparatively more efficient use of the storage medium. This object is achieved according to the invention in a system that comprises:

- a determining means for determining a group of blocks of which it is expected that they can be read within one of a number of cycles spanning a planning horizon,
- a scheduler for, for each block of the group, selecting from the set of storage units in which the block is stored one storage unit from which the block is to be read, the scheduler being operative to balance the load on the storage units,
- a reader for in response to a block read request reading the corresponding block from the selected storage unit for supply in the corresponding stream.

In addition to the freedom to choose for some of the blocks from which storage unit the block will be read, the system according to the invention has the freedom to choose for some of the blocks during which cycle the block will be read. This additional freedom can be used to store a smaller portion of the blocks multiple times in the storage medium, while maintaining a comparable high probability that none of the storage units will be overloaded. By duplicating a smaller portion of the data blocks, obviously less storage space is required to store the file containing the film to be supplied to the user. Duplicating a smaller portion of the data blocks results in an increase of the probability of overload of a storage unit when assessed for a single cycle. However, the system according to the invention looks ahead a number of cycles and can prevent an overload situation by scheduling a critical block read request to another cycle. The probability that an actual overload for a storage unit would occur is very small, since that will only happen if for each of the cycles in which a certain block read request can be scheduled such a critical condition appeared that no additional read request can be allowed. For every cycle alone this is, even with a smaller portion of duplicated blocks, a small probability. Therefore, the probability that this would happen for all relevant cycles is very small.

Duplicating a smaller portion of the data blocks has a further advantage in that less data needs to be written to the storage medium. So less bandwidth of the storage medium is required for adding new titles. In a system where new titles are added on-line, i.e. while the system remains operational for supplying data to users, it is important that a smaller fraction of the available bandwidth needs to be reserved for writing data since a larger fraction can then be allocated to the retrieval of data for users thus making it possible to service more users.

In an embodiment of the system according to the invention, blocks are identified that must be read in the present cycles and easily allows the separate scheduling of reading those blocks in the present cycle.

In an embodiment of the system according to the invention, the classification of the group into the subgroups allows for different handling of the block read request according to their specific needs and characteristics.

In an embodiment of the system according to the invention, by balancing the load for the second subgroup, the storage units have more capacity available to schedule for the present cycle more read requests for blocks that are not yet necessary but will probably become necessary in the near future. By already scheduling and reading those future blocks in the present cycle, the probability for no overload in the future.

In an embodiment of the system according to the invention, by taking the expected block read request for all cycles in the planning horizon in to account, a better scheduling can be made for those cycles. This increases the total number of blocks that can be read by the storage units and therefore increases the probability that no overload condition occurs. Alternatively, a smaller portion of the blocks need to be duplicated to realize the same probability.

In an embodiment of the system according to the invention, the algorithm of the scheduler of this embodiment requires little computational effort for deriving the schedule of block read requests.

It is a further object of the invention to provide a method as described in the preamble in which a comparatively more efficient use is made of the storage medium. This object is achieved according to the invention in that a cycle of the method comprises:

determining a group of blocks of which it is expected that they can be read within one of a number of cycles spanning a planning horizon, scheduling a read request for each block of the group, including selection from the set of storage units in which the block is stored one storage unit from which the block is to be read, the read requests being scheduled such that the load on the storage units is balanced, in response to the block read requests reading the corresponding blocks from the selected storage unit for supply in the corresponding stream.

The invention and its attendant advantages will be further elucidated with the aid of exemplary embodiments and the accompanying schematic drawings, wherein:

FIG. 1 schematically shows a block diagram of a system according to the invention.

FIG. 1 schematically shows a block diagram of a system 100 according to the invention. An example of such a system 100 is a multimedia server. Multimedia applications can be characterized by an extensive use of audio-visual material. For the playback of audio or video a (near-)continuous supply of audio/video data is required. Known examples of a multimedia server include a near-video-on-demand server and a video-on-demand server. In a near-video-on-demand system the service provider determines when a title is reproduced. A data stream containing the data of the title may be received by many users simultaneously. In a video-on-demand system, typically the user selects a title and controls, with VCR-like controls, the reproduction of the title. The level of interaction is higher and a data stream is typically only consumed by one user. A multimedia server is usually implemented using a file server which is specifically designed to supply continuous data streams for a large number of users in parallel. Usually, one or more multimedia titles are stored on a background storage medium 110. At this moment, normally disks, such as hard disks, are used as the background storage medium 110, based on their large storage capacity at low cost and the possibility of random access. It will be appreciated that also other storage media, such as optical disks, tape, or even solid state memory may be used. The storage medium 110 is divided into a plurality of storage units (shown are 102, 104, 106 and 108). As such, the storage medium 110 may be formed by a cluster of storage units, such as a RAID system. The storage unit, such as a hard disk, may itself be further subdivided (resulting in a hierarchical cluster). For a typical video-on-demand system, which uses disk-based storage media, the number of storage units forming the storage medium 110 is usually determined by the required bandwidth. The data streams are bounded by a maximum consumption rate of $c^{max}$ data elements per second, where a data element may for instance be a byte. Different streams may have different maximum consumption rate depending on the contents of the reproduced material, e.g. an audio stream has a far lower maximum consumption rate than a video stream. For variable bit-rate encoded MPEG-2 material the maximum consumption rate will typically be chosen to be between approximately 2 or 15 Mbit/sec, depending on the desired quality. In many systems, the data blocks are striped over all or a group of disks. A request for a data block results then in a disk access to all (or the group of) disks in the array. For the purpose of this description it is assumed that the storage medium 110 is formed by one storage unit with a suitably high bandwidth and/or storage capacity (whereas actually more than one storage unit may be used). It will be appreciated that in practice the maximum consumption rate for some data streams may be lower, for instance if the corresponding title is of a lower quality or a different type (e.g. audio, whereas most streams relate to a combination of audio and video) than a worse case situation for which the system usually is designed.

The system 100 comprises a reader 180 for reading data from the storage medium 110. The reader 180 may, for instance, be implemented using a SCSI interface. Advantageously, the storage medium 110 is also included in the system 100. For a disk oriented storage medium 110, data is retrieved in units of a block, where a block is formed by a sequence of consecutive sectors. Typically, blocks which are successively read from a same disk are not stored contiguously on the disk. Usually, blocks which are successively read from the same disk belong to different files (where a file is the collection of blocks belonging to one title) since the disk has to supply blocks for a plurality of data streams in some interleaved manner. Even if blocks which are to be read successively belong to the same file, successive blocks of a file need not be stored contiguously in one storage unit but can be distributed over the storage unit or even over several storage units of the storage medium 110. As a consequence of reading non-contiguous blocks, the disk head needs to be moved in between reading of a block and the appropriate starting point of the next block has to be awaited. Such a switch can take a considerable time, during which no data can be read. To reduce the switching overhead, the so-called disk sweeping technique is frequently used. In such a scheme, the reader 180 is able to read a number, of for instance eight blocks, from the storage unit 10 in one batch. The blocks of the batch are ordered based on their physical track position. For the read operation, the disk head is moved in only one direction (e.g. from the inner edge to the outer edge or vice versa), only stopping to read the blocks of the batch. In this way, the switching overhead is reduced significantly. Advantageously, a reader 180 is used which accepts a batch of read requests and internally performs the necessary scheduling of the requested read operations in order to perform the most optimal sweep for the specific disk. The reader 180 may also include a caching memory for temporarily storing data read from the disk before supplying the data, potentially in a different sequence than read from disk, via a bus 140 to the remainder of the system 100. It will be appreciated that the role of the reader 180, such as controlling the reading, arranging a sweeping sequence and caching read data, may also be distributed, where each of the storage units has its own controller performing these functions. If so, a main task of the reader 180 is to co-ordinate the operations of the various control units.

Particularly for video, a data stream may be very voluminous. To reduce the volume, typically, compression techniques are used. The compression scheme may result in a fixed rate data stream, for instance using a fixed rate form of MPEG-1 encoding, or a variable rate data stream, for instance using a variable rate form of MPEG-2 encoding. The system according to the invention may be used for fixed rate systems as well as variable rate systems. For variable data rate streams a fixed maximum consumption rate of $c^{max}$ data elements per second may be given, which rate may be different for different streams and which is used for configuring the system (e.g. bandwidth of the system and/or size of storage) in order to ensure that the system still operates in a worst case situation (e.g. when all data streams consume data at the maximum data rate). Normally, the data is stored in the storage medium 110 and processed by the system 100 in a compressed form. Only at the user 130 the data stream is decompressed, using a decoder. Particularly for a variable rate system, the system 100 may also be able to support VCR-like control functions. A data stream may be in one of a plurality of states like an active and a new/halted state, where an active data stream may supply data to a user (i.e. the user may consume data) and a new or halted data stream may (currently) not supply data to a user (i.e. no sufficient data is present for consumption by a user without running the risk that underflow of the corresponding buffer occurs). Typically, if a user temporarily stops consuming data, the stream stays active. If the user switches stream (e.g. explicitly selects a new title or implicitly is provided with a new stream by, for instance, instructing the system to play in fast forward mode which results in selecting a new stream with the same title being displayed fast), the stream is temporarily halted allowing for new data to be loaded. It will be appreciated that a slow motion function may be implemented by consuming data at a low rate (the stream remains active) or switching to a new stream (the stream is temporarily halted). The system 100 maintains for the data stream a stream status which indicates the current state. The stream status for one or more data streams may be stored in a status memory 190, such as the main memory (RAM) of the server or special registers.

Data is read from the storage medium 110 for a batch of data streams where the data of the batch is supplied as a time multiplexed stream via the bus 140. The storage medium 110 is not capable of simultaneously supplying continuous data streams to all users of the system. Instead, data for a subset of data streams is read and supplied to the remainder of the system 100 at a higher data rate then consumed by the corresponding data streams. The system 100, therefore, comprises buffers 125 for achieving supply of data at the required rate to the users 130. Usually, the buffers 125 are implemented using RAM in a part 120 of the system's memory. The system 100 further comprises communication means 150 for transferring data of the data streams to users. The communication means 150 may be formed by any suitable means, such as a local area network, for supplying the data to users located near the system 100. In practice, a telecommunication or cable network is used for supplying the data over a longer distance.

The system 100 also comprises a control unit 160 for controlling the system 100. The control unit comprises a determining unit 165 and a scheduler 170. The determining unit 165 determines which blocks should be read from the storage medium 110 in order to avoid that an underflow or overflow of the buffers 125 occurs. The scheduler 170 determines a schedule for the blocks to be read and controls the reader 180 for reading the blocks in time. The control unit is typically formed by a processor, such as a RISC-, or CISC-type microprocessor, which is operated under control of a real-time operating system, loaded from a storage medium, such as ROM or a hard disk. The determining unit 165 and the scheduler 170 may be implemented as respective software modules integrated into the operating system or loaded as respective application programs. Typically, the determining unit 165 receives status information, such as a filling degree of the buffers, upon which the scheduler 170 bases its decision. For systems which offer VCR-like controls, the scheduler also receives information regarding the status of a stream. In such systems, typically, control information is received from the users 130 via the communication means 150.

A portion of the blocks is stored multiple times in the storage medium 110 by being stored in at least two different and randomly selected storage units. These blocks are duplicated in full. As a result such a block is available in full from each of the storage units on which the block is stored. The blocks for new titles may be stored when the storage units are off-line, i.e. when the system is not operational supplying data to users. However, usually, the new titles will be stored in the storage units when the system is operational. Part of the bandwidth may then be reserved for changing titles stored in the storage units or such an operation may be performed at moments when the system is not fully loaded. The system comprises means (not shown in the figure) for storing a portion of blocks multiple times in the storage, by ensuring that such a block is stored in at least two storage units. Preferably, such a block is stored in exactly two storage units, where the storage units are selected randomly from the set of storage units of the storage medium 110. The selection of the storage units is performed separately for each block that is stored multiple times. A (pseudo-)random sequence generator may be used to generate a random number within the range of available storage units. For each successive block of the portion of blocks a next random number indicates the storage unit in which the means stores the block. As described in WO 98/54657, selecting the storage units randomly allows a good balancing of the load of the storage units when retrieving the blocks. Besides selecting the storage unit(s) in a (pseudo-)random manner, the person skilled in the art will be able to choose a suitable algorithm which for a given system achieves the desired random effect. Obviously, a block which is stored multiple times is stored each time in a different storage unit, since otherwise the multiplication would not result in an improvement of the load balance. This is simply achieved by using a next random number, if a generated number corresponds to a storage unit which already stores the involved block. It will be appreciated that instead of storing a selected block in two storage units the block may also be stored in more storage units.

In the system according to the invention, each block of a title is stored on one of the storage units, which are disks, chosen at random. In addition, a block is copied to another disk with a probability r. Hence, in this system a fraction r of the data is duplicated. The parameter r is a design parameter chosen such that 0<r<1. The scheduling is based on operation of the system in cycles and the block sizes are chosen such that each stream consumes at most one block per cycle. Each stream has an associated buffer that can contain up to s blocks of data, s in {3, 4, 5, ... }. This gives the scheduler the freedom to schedule a read request for a particular block in one of s-2 cycles. A typical choice in the system according to the invention is that s equals 5. A disk of the storage medium has the capacity to supply at least k blocks per cycle. The scheduler determines for each desired block, from which disk it is to be read and during which one of the s-2 cycles it is to be read. The scheduler does this in such a way that one disk is to supply at most k blocks per cycle. Theoretically this is not always possible, but the parameters r, s and k can be chosen such that the probability of failure is made arbitrarily small. This is shown in the following example system. This system has 100 user streams and 10 disks, each of which can retrieve 11 blocks per cycle. The Table I below shows the smallest duplication fraction r that did not result in disk load larger than 11 blocks per cycle for different values of s in a simulation of 1 million successive cycles. In this simulation, each user stream required a block to be read in each of the cycles.

TABLE I

Duplication fraction for different buffers sizes

| Buffer size s | Duplication fraction r |
| --- | --- |
| 4 | 0.70 |
| 5 | 0.25 |
| 6 | 0.15 |
| 7 | 0.10 |
| 8 | 0.05 |

The system according to the invention determines for a certain number of cycles in the future, which are together called the planning horizon, which blocks are expected to be requested by the user streams. This expectation is based on the assumption that the current streams keep consuming data during the planning horizon. Since this is only reliably known for the next few cycles, the size p of the planning horizon is kept small, typically in the same order as the size s of the buffer, so for example p equals 5. At the beginning of each cycle, the determining unit 165 determines which blocks are to be read based on the information for the planning horizon only. The scheduler 170 then determines the schedule how this can be realized. There are several ways that such a schedule can be produced and below two alternatives are described.

In the first alternative, the scheduler classifies at the beginning of a cycle the requests for blocks into the following classes:
1. Blocks that must be read in this cycle and that are not duplicated.
2. Blocks that must be read in this cycle and that are duplicated.
3. Blocks that may be read in this cycle but may also be delayed for at least one cycle and that are not duplicated.
4. Blocks that may be read in this cycle but may also be delayed for at least one cycle and that are duplicated.

The strategy of the scheduler is to fill the current cycle with as many blocks as possible. The scheduler considers the requests for blocks per class in the order given above.
1. There is no freedom in this class. All blocks must be fetched in the current cycle and from a given disk since there is stored only one copy of each of the blocks.
2. All blocks of this class must be fetched in this cycle but there is a freedom regarding the disk from which a block is to be fetched. The scheduler uses this freedom to balance the load on the disks.
3. The blocks of this class may be used to fill up the load of any disk up to the maximum of k blocks.
4. The blocks of this class may be used to fill up the load of any disk up to the maximum of k blocks. However, since these blocks are duplicated they will cause less load balancing problems for future cycles and therefore preference is given to blocks from class 3 over blocks of this class 4.

In an embodiment of this alternative, the scheduler schedules all blocks of class 1, then optimizes class 2 with the Linear Assignment algorithm described in WO 98/54657, then adds as many blocks of class 3 as possible and finally adds as many blocks of class 4 as possible by using the Linear Assignment algorithm again.

In the second alternative, the scheduler constructs a schedule for the complete planning horizon at the start of each cycle. The scheduler uses the following classification of requests for blocks:
A. Requests for blocks for which all (remaining) scheduling possibilities are within the planning horizon.
B. Requests for blocks that may be scheduled during the planning horizon but that also have possibilities thereafter and which blocks are not duplicated so that there is no choice of disk.
C. Requests for blocks as in class B but which block are duplicated so that there is choice of disk.

The scheduler is to schedule at least the requests in class A. In addition, it tries to schedule as many requests of classes B and C as possible. Of these requests, the scheduler prefers requests of class B, since they have a higher probability than requests of class C and should therefore be dealt with as soon as possible. Now in this second alternative, the scheduling problem is formulated as a maximum flow problem which can be solved fast. The cited reference WO 98/54657 also describes such a scheduling algorithm. The requests of the above defined classes are dealt with in the following steps.

Step 1

The problem to determine whether all class A requests can be scheduled is defined as a maximum flow problem. This maximum flow problem is defined on a graph that has a node for each such request and a node for each (disk, cycle) pair that falls in the planning horizon, and additionally one source and one destination node. An arc is introduced from the source node to each request node, and from each (disk, cycle) node to the destination node. In addition, an arc is introduced from each request node to the (disk, cycle) node on which this requests can be executed. The capacity of each arc that runs from a request node to a (disk, cycle) node equals one. The arcs that run from the source node also have capacity one. In addition, the arcs from a (disk, cycle) node to the destination node have capacity k. Now, the class A requests can be scheduled if and only if a flow from source to destination can be realized that saturates all arcs leaving the source node. The resulting flow gives a feasible schedule for class A requests.

Step 2

If the resulting flow is smaller than pmk, i.e. the product of p, m and k, where p denotes the length of the planning horizon, expressed in number of cycles, m denotes the number of disks, and k the number of blocks fetched from disk per cycle, then additional class B requests can possibly be added. To maximize the number of class B requests that can be added, we construct an additional maximum flow problem, defined on the following graph. Again, for each (disk, cycle) pair there is a node, and for each class B request there is a node, and, as above, there are a source and a destination node. Now, arcs are introduced between each pair of (disk, cycle) nodes. The arc from node (disk, cycle) to (disk', cycle') has a capacity that gives the number of class A requests that have been assigned to (disk, cycle) but can also be assigned to (disk', cycle'). The arc from (disk, cycle) to the destination node has a capacity equal to k minus the total number of class A requests that are assigned to (disk, cycle). The arcs from source node to the request nodes and from request nodes to (disk, cycle) nodes all have capacity one. By maximizing the flow from source to destination, a maximum number of class B requests are added in such a way that class A requests can be moved around but not removed from the schedule.

Step 3

Again, if the resulting flow is smaller than pmk, i.e. the product of p, m and k, then additional class C requests can possibly be added. To maximize the number of class C requests that can be added, again a maximum flow problem is constructed in an analogous way as for the class B requests. The class A and class B requests that are already scheduled are again incorporated into the arcs that run between the (disk, cycles) nodes. From the result of this maximum flow computation a schedule can be constructed. Again, no class A or class B request can be removed.

The size s of the buffers in the above embodiments has been given a minimal value of 3. This typically applies to a variable bit rate system, where the size of a buffer usually is designed large enough to be able to contain to 3 blocks. This size makes that with a suitable scheduling strategy, the buffers will underflow nor overflow when the system is in operation. According to the invention, the buffer size is chosen larger then this minimal size 3 and the additional space is then used to store the pre-fetched blocks from future cycles as described above. It is to be understood that the actual minimal size of the buffer is not relevant for the present invention and the requirement is that the buffer can accommodate one or more above its minimal number. Therefore, the invention can equally well be applied in systems with buffers that have an original (minimal) size of 2 blocks. Such buffers can be found in fixed bit rate systems with cycles for consumption and block reading of fixed duration.

It should be noted that the above-mentioned embodiments illustrate rather than limit the invention and that those skilled in the art will be able to design many alternative embodiments without departing from the scope of the appended claims. In the claims, any reference signs placed between parentheses shall not be construed as limiting the claim. The word 'comprising' does not exclude the presence of elements or steps other than those listed in a claim. The word "a" or "an" preceding an element does not exclude the presence of a plurality of such elements. The invention can be implemented by means of hardware comprising several distinct elements and by means of a suitably programmed computer. In the unit claims enumerating several means, several of these means can be embodied by one and the same item of hardware.

What is claimed is:

1. A system for retrieving blocks of data in cycles from a storage medium and supplying the blocks in the form of data streams to users, wherein a number of the blocks are stored multiple times in respective storage units of the storage medium, the system comprising:

a determining means for determining a group of blocks expected to be read within one of a number of cycles spanning a planning horizon, a scheduler for, each block of the group, selecting from the set of storage units in which the block is stored one storage unit from which the block is to be read, the scheduler being operative to balance the load on the storage units, a reader in response to a block read request reading the corresponding block from the selected storage unit for supply in the corresponding stream.

2. A system as claimed in claim 1, wherein the determining means is arranged to classify the group into a first subgroup comprising the blocks which must be read in the present cycle and a second subgroup comprising the blocks which may be read in the present cycle but may also be delayed.

3. A system as claimed in claim 1, wherein the determining means is arranged to classify the group into:

a first subgroup containing blocks that must be read in the present cycle and that are not stored multiple times in the storage medium, a second subgroup containing blocks that must be read in the present cycle and that are stored multiple times in the storage medium, a third subgroup containing blocks that may be read in the present cycle but may also be delayed for at least one cycle and that are not stored multiple times in the storage medium, and a fourth subgroup containing blocks that may be read in the present cycle but may also be delayed for at least one cycle and that are stored multiple times in the storage medium.

4. A system as claimed in claim 3, wherein the scheduler is arranged to balance the load on the storage units for scheduling the read requests for blocks of the second subgroup and wherein the scheduler is arranged to add read requests from the third and fourth subgroup to a predetermined maximum for each of the storage units.

5. A system as claimed in claim 3, wherein the scheduler is arranged to balance the load on the storage units for scheduling the read requests for blocks of the fourth subgroup.

6. A system as claimed in claim 1, wherein the determining means is arranged to determine in the group a first subgroup comprising blocks expected to be read in a cycle in the planning horizon and wherein scheduler is arranged to schedule the read requests for the blocks of the first subgroup with balancing of the load on the storage units.

7. A system as claimed in claim 6, wherein the scheduler is arranged to schedule the read requests by using a maximum flow algorithm.

8. A system as claimed in claim 7, wherein the determining means is arranged to determine in the group a second subgroup comprising blocks expected to be read in a cycle in the planning horizon but that they may also be read in a cycle beyond the planning horizon and which are not stored multiple times in the storage medium, and wherein the scheduler is arranged to determine whether each of the available storage units is scheduled to read its maximum number of blocks in each of the cycles in the planning horizon and, if this is not the case, to additionally schedule read requests for the blocks of the second subgroup.

9. A system as claimed in claim 8, wherein the determining means is arranged to determine in the group a third subgroup comprising blocks expected to be read in a cycle in the planning horizon but that they may also be read in a cycle beyond the planning horizon and which are stored multiple times in the storage medium, and wherein the scheduler is arranged to determine whether each of the available storage units is scheduled to read its maximum number of blocks in each of the cycles in the planning horizon and, if this is not the case, to additionally schedule read requests for the blocks of the third subgroup.

10. A method of retrieving blocks of data in cycles from a storage medium and supplying the blocks in the form of data streams to users, wherein a number of the blocks are stored multiple times in respective storage units of the storage medium, a cycle comprising:

determining a group of blocks expected to be read within one of a number of cycles spanning a planning horizon, scheduling a read request for each block of the group, including selection from the set of storage units in which the block is stored one storage unit from which the block is to be read, the read requests being scheduled such that the load on the storage units is balanced, in response to the block read requests reading the corresponding blocks from the selected storage unit for supply in the corresponding stream.

* * * * *